United States Patent [19]

Horst

[11] Patent Number: 5,041,069

[45] Date of Patent: Aug. 20, 1991

[54] DRIVE ASSEMBLY FOR A MOTOR VEHICLE

[75] Inventor: Joachim Horst, Mackenbach, Fed. Rep. of Germany

[73] Assignee: Viscodrive GmbH, Lohmar, Fed. Rep. of Germany

[21] Appl. No.: 500,363

[22] Filed: Mar. 28, 1990

[30] Foreign Application Priority Data

Apr. 14, 1989 [DE] Fed. Rep. of Germany ....... 3912304

[51] Int. Cl.$^5$ .................. F16H 1/44; F16D 3/14; F16D 3/22; F16D 3/24
[52] U.S. Cl. ...................................... 475/231; 475/86; 475/153; 475/222; 475/230; 475/150; 475/246
[58] Field of Search ................. 475/86, 150, 153, 154, 475/157, 222, 231, 240, 246, 249, 253, 230; 464/146, 906, 145, 143, 111, 905

[56] References Cited

U.S. PATENT DOCUMENTS

| 1,887,705 | 11/1932 | Worrall | 475/153 |
|---|---|---|---|
| 2,102,973 | 12/1937 | Porsche | 475/222 X |
| 2,187,843 | 1/1940 | Rzeppa | 475/222 |
| 2,459,870 | 1/1949 | Cook | 475/150 |
| 2,927,654 | 3/1960 | Lee | 475/86 X |
| 2,965,181 | 12/1960 | Senkowski | 475/86 X |
| 3,460,404 | 8/1969 | Schmid | 475/86 |
| 3,642,103 | 2/1972 | Schott | 475/86 X |
| 3,923,113 | 12/1975 | Pagdin | 475/231 X |
| 4,723,464 | 2/1988 | Welschof et al. | 475/230 X |
| 4,793,212 | 12/1988 | Welschof et al. | 475/222 |
| 4,836,051 | 6/1989 | Gumbretree | 475/246 X |
| 4,840,087 | 6/1989 | Welschof et al. | 475/222 |
| 4,841,808 | 6/1989 | Ouchi et al. | 475/150 X |
| 4,893,525 | 1/1990 | Gábor | 475/246 X |
| 4,955,853 | 9/1990 | Bausch | 475/231 X |
| 4,974,714 | 12/1990 | Goscenki, Jr. | 475/86 X |

FOREIGN PATENT DOCUMENTS

| 0600138 | 6/1960 | Canada | 475/86 |
|---|---|---|---|
| 1186751 | 2/1965 | Fed. Rep. of Germany | 475/222 |
| 1903938 | 8/1970 | Fed. Rep. of Germany | 475/222 |
| 8178040 | 10/1983 | Japan | 475/150 |
| 62-91319 | 4/1987 | Japan | |
| 8807639 | 10/1988 | PCT Int'l Appl. | 475/150 |
| 0385766 | 6/1973 | U.S.S.R. | 475/86 |
| 1224034 | 3/1971 | United Kingdom | 475/86 |
| 2059523 | 4/1981 | United Kingdom | 475/86 |
| 2218778 | 11/1989 | United Kingdom | |

Primary Examiner—Leslie A. Braun
Assistant Examiner—David E. Henn
Attorney, Agent, or Firm—Toren, McGeady & Associates

[57] ABSTRACT

The invention is concerned with a drive assembly (8) comprising a differential (16). The differential (16) comprises a driving carrier (18) and two driven output gears (19) connected to joints (11) to driveshafts (12). The assembly (8) also comprises a coupling (48) by which one of the gears (19) may be connected directly to the carrier (18). The joint (11) associated with said gear (19) is positioned outside the differential (16) directly adjacent thereto and extends coaxially around an outer part (26) of the joint (11). An inner part of the coupling (48) is connected to the outer part of the joint (11) and an outer part (31) of the coupling is connectable to the carrier (18). The coupling (48) may be a viscous coupling.

11 Claims, 3 Drawing Sheets

DRIVE ASSEMBLY FOR A MOTOR VEHICLE

BACKGROUND TO THE INVENTION

1. Field of the Invention

This invention is concerned with a drive assembly for a motor vehicle comprising a differential having a driving input member and two driven output members, at least one of the output members being connected to a joint associated with a driveshaft, the drive assembly further comprising a coupling by which said output member may be connected directly to the input member.

In such a drive assembly, it is not unusual to use a coupling, which may, for example, be in the form of a fluid friction coupling to lock the differential at least partially. Such a coupling may be incorporated in the housing of the differential or the housing may be modified so that the coupling is at a considerable distance from the differential in order to achieve equal lengths for the driveshafts leading to the driving wheels. The purpose of this modification is to achieve equal articulation conditions. Such designs are usually used in the driven front axle of a front wheel drive vehicle.

SUMMARY OF THE INVENTION

It is the object of the present invention to provide a drive assembly including a coupling for at least partially locking the differential, which drive assembly may be used without having to substantially modify the housing receiving the differential and without having to reduce the lengths of the driveshafts leading to the output wheels.

The invention provides a drive assembly for a motor vehicle comprising a differential having a driving input member and two driven output members, at least one of the output members being connected to a joint associated with a driveshaft, the drive assembly further comprising a coupling by which said output member may be connected directly to the input member, wherein the joint is positioned directly adjacent to the differential and the coupling is positioned outside the differential so that it extends coaxially around an outer part of the joint, an inner part of the coupling being connected or connectable to the outer part of the joint and an outer part of the coupling being connected or connectable to the input member of the differential.

By coaxially designing and connecting the coupling to the outer joint part none of the driveshaft length is lost. Thus, no adverse effect applies to the articulation conditions. Furthermore, the coupling forms one unit with the joint and driveshaft and in consequence, may be fitted to the differential housing retrospectively or subsequently replaced because only the region of the aperture of the connecting pin of the joint at the differential end needs to be modified. In practical terms, this modification merely affects the cover and the seal for laterally sealing the housing in which the differential is accommodated.

There are several ways of arranging the coupling serving to at least partially lock the differential effect of the differential. According to a first embodiment, it is conceivable for the outer part of the coupling to be non-rotatingly connected to the input member of the differential and for the inner part of the coupling to be non-rotatingly connected to the outer part of the joint. In consequence, there exists a permanent locking effect when a relative movement occurs between the two. This is the case, for example, if the output speed of the outer part of the joint deviates from that of the differential input member.

Alternatively, the outer part of the coupling may be optionally connectable to the input member of the differential by a switching device and the inner part of the coupling may be non-rotatingly connected to the outer part of the joint.

Furthermore, it is possible that the outer part of the coupling may be non-rotatingly connected to the input member of the differential and the inner part of the coupling may be optionally connectable to the outer part of the joint part by means of a switching device.

If switching devices are provided, it is possible to choose a mode of operation which, if applied to a vehicle having an anti-locking device, may be switched in such a way that no locking effect is generated if the operating brake is applied. The switching device is preferably designed so as to operate electro-magnetically, and it is possible to select a method of operation where the coupling remains connected under normal driving conditions, i.e. it is permanently connected to the input of the differential and to the outer part of the joint, whereas when the operating brake of the vehicle is actuated, for example, this non-rotating connection is eliminated by a suitable switching device in order to avoid any influence on the vehicle behaviour during over-braking or when anti-locking devices are used.

According to a further feature of the invention, the differential is designed as a bevel gear differential, with the output member being formed by an output bevel gear and the input member by a differential carrier.

Alternatively, it is conceivable for the differential to be designed as a spur gear differential.

According to a further preferred embodiment of the invention, the coupling is designed as a fluid friction coupling comprising a housing as an outer coupling part, an inner coupling part relatively rotatable in the housing, inner plates non-rotatingly connected to the inner coupling part and outer plates non-rotatingly connected to the outer coupling part, the inner and outer plates being within the housing in overlapping relationship and being arranged in an alternating sequence, the coupling further comprising a viscous medium at least partially filling the remaining part of the interior of the housing.

Such fluid friction couplings (also referred to as viscous couplings) have an advantage in that they achieve relatively soft starting characteristics for the transmission of torque when the locking effect is built up. According to a further embodiment of the invention, the coupling may be designed as a plate friction coupling comprising a housing as an outer coupling part, an inner coupling part relatively rotatable in the housing and pressurised inner and outer friction plates respectively non-rotatingly connected to the inner coupling part and the housing and arranged in an alternating sequence. The disadvantage of such a design is that there constantly exists a certain locking value. The maximum locking value achievable is the set value resulting from the friction conditions. The plate friction coupling is torque-controlled, whereas the fluid friction coupling builds up a locking value as a function of speed, i.e. the differential speed.

Alternatively, it is also conceivable for the inner part of the coupling to be formed by the outer part of the joint, whose outer face comprises means for non-rotatingly receiving the inner plates.

It is further proposed that the joint should be designed as a constant velocity universal joint. Such joints, especially constant velocity ball joints, have a rotationally-symmetric outer part suitable for attaching the inner plates of the coupling and for supporting the outer coupling part.

BRIEF DESCRIPTION OF THE DRAWINGS

Preferred embodiments of the invention are diagrammatically illustrated in the drawings by way of example.

In the drawings.

DESCRIPTION OF PREFERRED EMBODIMENTS

Figure 1:
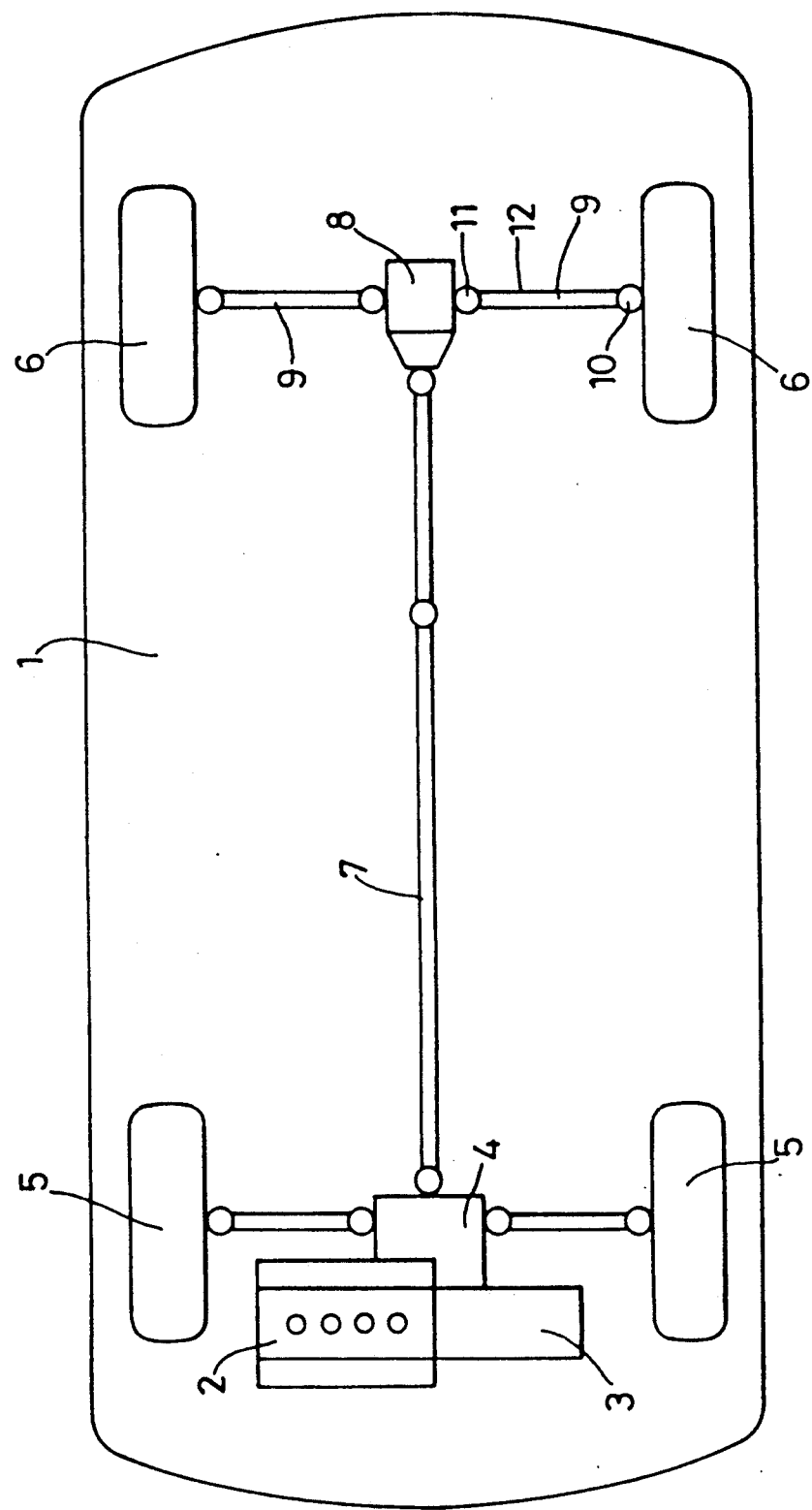
FIG. 1 is a diagrammatic view of a drive concept for a motor vehicle for which the drive assembly of the invention is suitable.

FIG. 1 shows a four wheel drive vehicle 1 whose engine 2, by means of a gearbox 3, a front axle differential 4 and front sideshafts, drives front wheels 5. In addition, by means of a propeller shaft 7, the rotary movement branches off the front axle differential 4. The propeller shaft 7 serves to drive a drive assembly 8 which, by means of the rear sideshafts 9, is in torque connection with rear wheels 6. The rear sideshafts 9 consist of joints 10 at the wheel end and joints 11 at the differential end as well as intermediate shafts 12 connecting the two.

The drive assembly 8 is explained in more detail with reference to FIGS. 2 and 3. The drive assembly 8 comprises a differential 16, arranged in a housing 13, as well as a viscous coupling 48 arranged outside the housing 13 and positioned coaxially relative to the joint 11 at the differential end.

The differential 16 is designed as a bevel gear differential and comprises a differential carrier 18 held rotatably by bearings 17 in the housing 13.

The differential carrier 18 serves as a driving input member of the differential and is associated with a crown gear 15 drivable by a driving gear 14. The driving gear 14 is driven by the propeller shaft 7. Two differential bevel gears 21 are rotatably arranged in the differential carrier 18 at right angles relative to its axis of rotation on a differential support 22 designed as a pin. The differential bevel gears 21 engage two output bevel gears 19 rotatably accommodated in the differential carrier 18 and rotatable about the same axis. The two output bevel gears 19, which provide driven output members of the differential, each comprise a bore 20 into which splined joint journals 23 connected to the joints 11 are inserted. One of these two joints 11 is associated with a coupling 48 of the drive assembly. The coupling 48 serves to connect the output bevel gear 20 directly to the input carrier 18. This joint 11 is positioned directly adjacent to the differential and comprises an outer joint part 26 connected to the joint journal 23 by means of a flange 24 and fixing bolts 25. The outer joint part 26 is simultaneously designed as the inner coupling part of the fluid friction coupling 48. The outer coupling part 31 is designed as a housing and is rotatably supported on the outer joint part 26. The outer coupling part 31 is closed by covers 32, 33 which by means of seals 34, ensure that it is sealed relative to the outer joint part 26. Thus, the coupling 48 is positioned outside the differential so that it extends coaxially around the outer part 26 of the joint 11. The inner part of the coupling 48 is connected to the outer part of the joint 11, being integral therewith.

Plates 35, 36 are arranged in the annular space formed between the outer face of the outer joint part 26, and the housing 31 as well as the lateral covers 32 and 33. Part of the outer face of the outer joint part 26, i.e. the part associated with the annular space, is provided with teeth 37 which non-rotatingly receive annular inner plates 35. The inner face of the housing 31 is also provided with teeth 38 accommodating the outer plates 36 by means of corresponding teeth provided at their outer circumference. The inner plates 35 and outer plates 36 are arranged to alternate in the housing interior. The outer plates 36 for example may additionally be spaced relative to each other, whereas the inner plates are axially movable relative to the outer plates 36 in the direction of the teeth 37. The part of the interior of the housing 31 not occupied by the plates 35, 36 is at least partially filled with a viscous medium, especially silicone oil. If there occurs a differential speed between the housing 31 and the outer joint part 26, the viscous medium is sheared between the plates 35, 36 and a locking moment acting on the differential 16 is generated by the further drive elements described. One of the covers, i.e. the cover 32 facing the differential 16 is provided with coupling teeth 40 which may engage corresponding counter teeth 42 associated with a switching ring 41. The upper half of FIG. 2 referring to the coupling 48 shows the switching ring 41 in its position removed from the teeth 40 of the housing 31 in which the switching ring 41 and the housing 31 do not engage. By means of springs 45, the switching ring 41 is nOn-rotatingly connected to a connecting sleeve 44 which in turn, by mutually complementary front teeth 46, is non-rotatingly connected to the differential carrier 18. For this purpose, the differential carrier, in the region of the bearing 17, has also been provided in its end face with front teeth. The teeth 42 of the switching ring 41, due to the springs 45, normally engage the teeth 40 of the housing 31. This position of the coupling 48 is illustrated in the lower half of FIG. 2. For axially moving the switching ring 41 against the force of the springs 45, there has been provided an electro-magnet excitable by a power source (not illustrated) and a circuit. The electro-magnet has been given the reference number 43. Thus, the outer part 31 of the coupling 48 is connectable to the carrier 18.

The joint 11 is designed as a constant velocity universal joint and consists of the outer joint part 26 simultaneously forming part of the coupling 48, the inner joint part 27 and balls 29 engagingly arranged between the two in their respective tracks and serving for the transmission of torque. The balls 29 are held in a control cage 28. The inner joint part 27 is connected to the intermediate shaft 12. For this purpose, the intermediate shaft 12, by means of splines, is inserted into a splined bore in the inner joint part 27. Normally the rear wheel 6 is driven by the differential carrier 18 and the joint 11 at the gearbox end if the two rear wheels 6 are balanced, i.e. if the same friction conditions exist at the two rear wheels 6, relative to the road surface. If one of the two rear wheels 6 is on a surface which has a lower adhesion coefficient than that of the other rear wheel 6, balanced conditions no longer prevail so that one of the output bevel gears 19 and thus one of the rear wheels 6 rotates faster than the other rear wheel. In an extreme case, one of the two rear wheels 6 is stationary, in which case there occurs a speed differential between the associated output bevel gear 19 and the differential carrier 18. This differential rotation is braked by the coupling 48 because in the connected condition of the coupling 48 (lower half of FIG. 2) there is also a differential speed between the inner plates 35 and the outer plates 36, which, due to the silicone oil contained in the housing interior, leads to a locking moment to be built up. There occurs a balance in speed as a result of which the rotary movement is transmitted to the other bevel gear 19 because the differential movement of the differential bevel gears 21 braked by the braked output bevel gear 19 is also reduced. In consequence, the other rear wheel 6 is also driven, with the coupling 48 acting in both directions, i.e. it is able to respond when one of the two wheels to be driven rotates faster than the differential carrier 18.

The entire coupling assembly consisting of the coupling 48 with the joint 11 and a switching device 39 is covered by a hood 47.

It can be seen that with the coupling 48 forming part of the joint 11 at the gearbox end, the driveshaft 9 in the form of one unit with the coupling 48, the joint journal 23 associated with the joint 11, including the connecting flange 24 as well as the switching device 39, can be a separate assembly unit and, depending on the application, it may be mounted on the differential 16.

In this way, it is possible to achieve a modular system which without having to carry out substantial modifications to the existing differential 16 which permits optional associations while at the same time avoiding any adverse effects on the length of the driveshaft 9. The distance between the joint centres of the joint 10 at the wheel and the joint 11 at the gearbox end affects the articulation of the two joints 10, 11. The shorter this distance, the greater the angle to be covered by the joints 10, 11. The greater the angle, the greater the losses in the joints.

Figure 2:
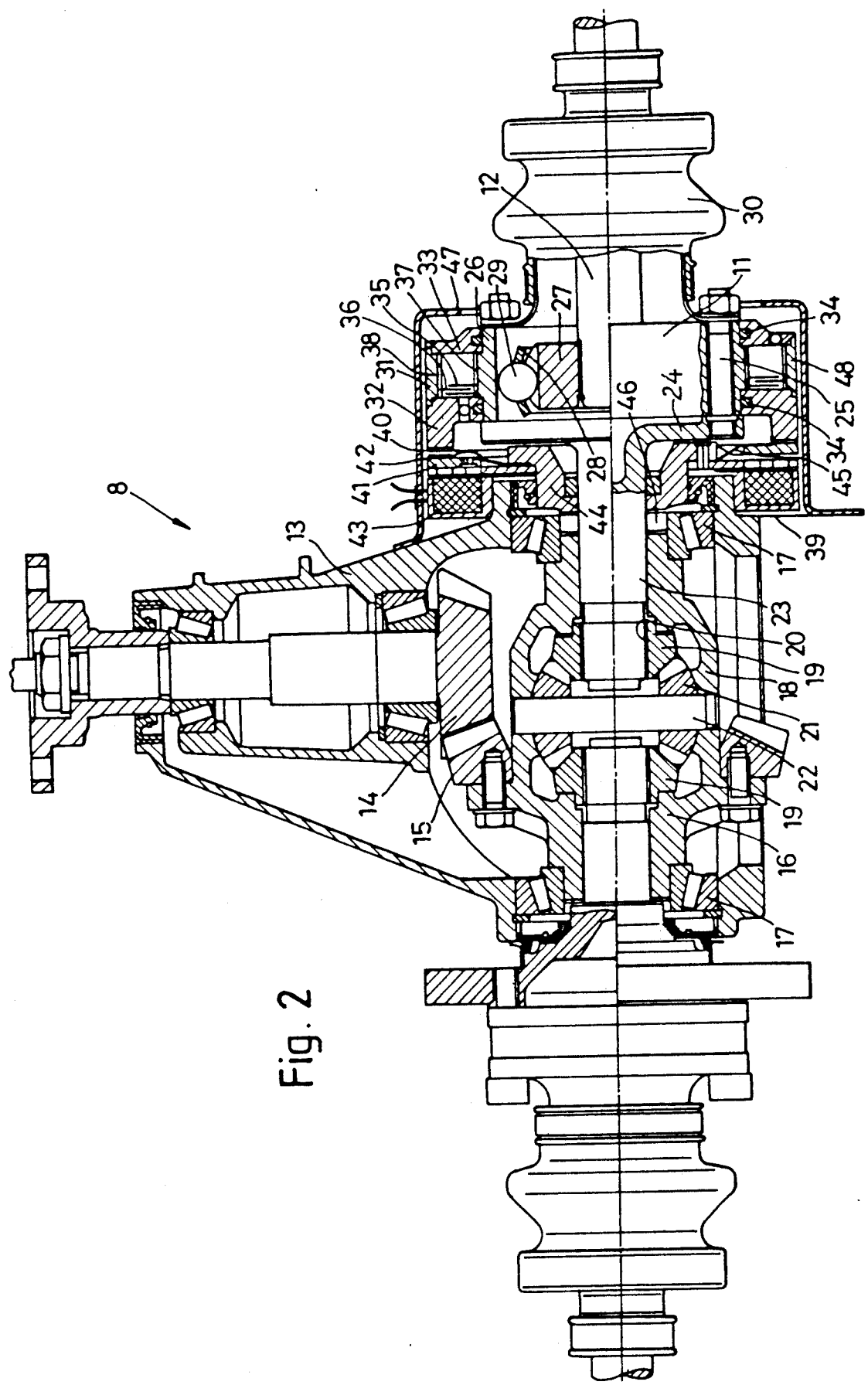
FIG. 2 is a section through a drive assembly according to the invention, with the coupling designed as a fluid friction coupling being shown in the disconnected condition in the upper half of the Figure and in the connected condition in the lower half of the Figure.
Figure 3:
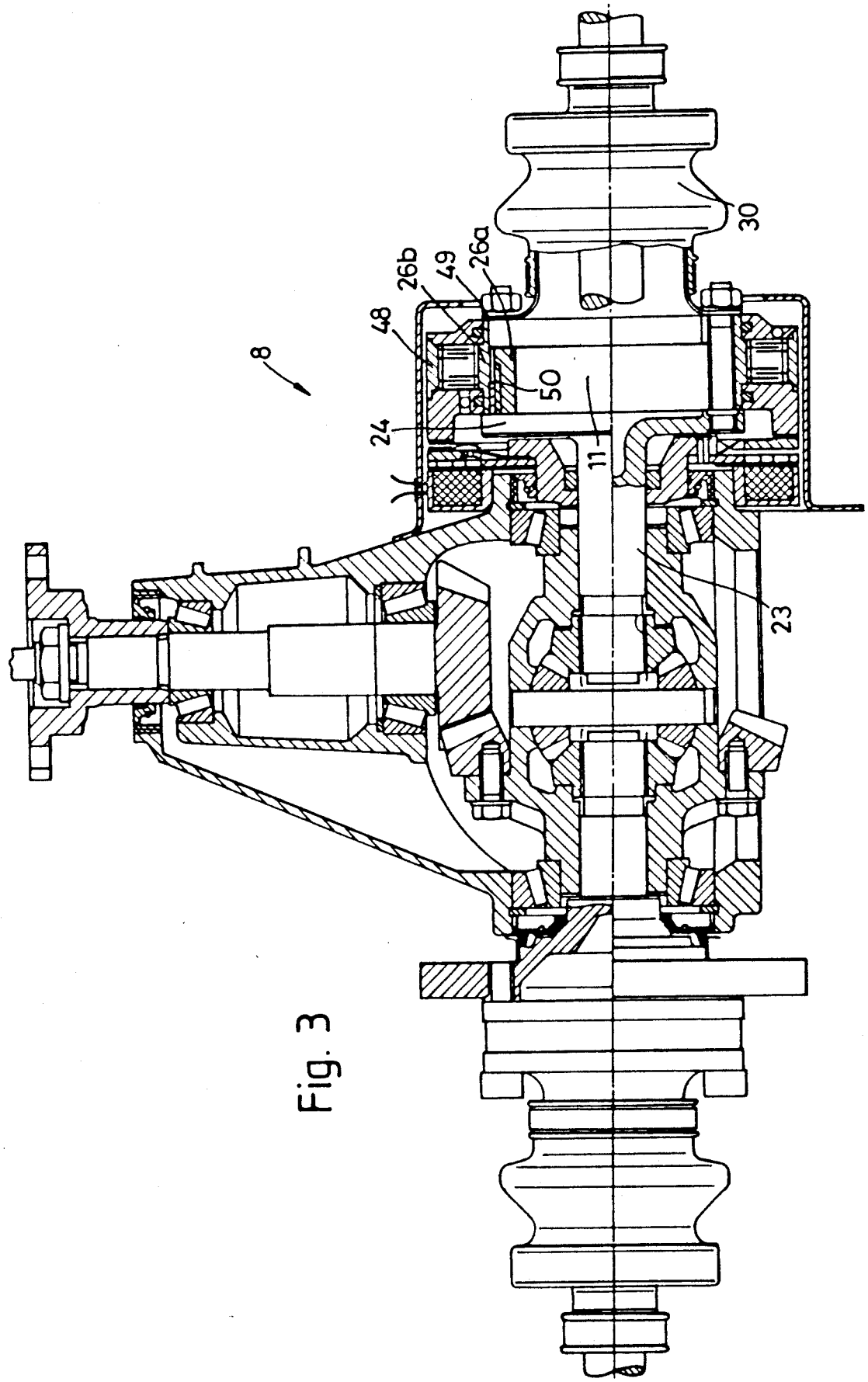
FIG. 3 is a view similar to FIG. 2 but of a modified embodiment in which the inner part of the coupling and the outer part of the joint are formed as separate components.

FIG. 3 shows a modified embodiment relative to FIG. 2, with the inner coupling part and the outer joint part 26 being separate components. In this case, the outer joint part has been given the reference number 26a. On its outer face, it has been provided with splines 50 receiving the corresponding splines of the inner coupling part 26b of the coupling 48. Laterally, the inner coupling part 26b is held by a flange 24 associated with the joint journal 23 of the joint 11 and by the cap 49 on the outer joint part 26. The cap 49 simultaneously serves to fix the boot 30.

I claim:

1. A drive assembly for a motor vehicle comprising a differential having a driving input member and two driven output members, at least one of the output members being connected to a joint associated with a driveshaft, the drive assembly further comprising a coupling by which one of said output members may be connected directly to the input member, wherein the joint is positioned directly adjacent to the differential and the coupling is positioned outside the differential so that it extends coaxially around an outer part of the joint, an inner part of the coupling being detachably connected or connectable to the outer part of the joint and an outer part of the coupling being detachably connected or connectable to the input member of the differential.

2. A drive assembly according to claim 1, wherein the outer part of the coupling is non-rotatingly connected to the input member of the differential and the inner part of the coupling is non-rotatingly connected to the outer part of the joint.

3. A drive assembly according to claim 1, wherein the outer part of the coupling is optionally connectable to the input member of the differential by a switching device and the inner part of the coupling is non-rotatingly connected to the outer part of the joint.

4. A drive assembly according to claim 3, wherein the switching device comprises electromagnetic operating means.

5. A drive assembly according to claim 3, wherein the joint is designed as a constant velocity universal joint.

6. A drive assembly according to claim 1, wherein the outer part of the coupling is non-rotatingly connected to the input member of the differential and the inner part of the coupling is optionally connectable to the outer part of the joint by means of a switching device.

7. A drive assembly according to claim 5, wherein the switching device comprises electromagnetic operating means.

8. A drive assembly according to claim 1, wherein the differential is designed as a bevel gear differential, with the output member being formed by an output bevel gear and the input member by a differential carrier.

9. A drive assembly according to claim 1, wherein the coupling is designed as a fluid friction coupling comprising a housing as an outer coupling part, an inner coupling part relatively rotatable in the housing, inner plates non-rotatingly connected to the inner coupling part and outer plates non-rotatingly connected to the outer coupling part, the inner and outer plates being within the housing in overlapping relationship and being arranged in an alternating sequence, the coupling further comprising a viscous medium at least partially filling the remaining part of the interior of the housing.

10. A drive assembly according to claim 9, wherein the inner part of the coupling is formed by the outer part of the joint whose outer face comprises means for non-rotatingly receiving the inner plates.

11. A drive assembly according to claim 1, wherein the coupling is designed as a plate friction coupling comprising a housing as an outer coupling part, an inner coupling part relatively rotatable in the housing and pressurised inner and outer friction plates respectively non-rotatingly connected to the inner coupling part and the housing and arranged in an alternating sequence.

* * * * *